US006236526B1

United States Patent
Hoekstra et al.

(10) Patent No.: US 6,236,526 B1
(45) Date of Patent: May 22, 2001

(54) AUDIO CASSETTE PLAYER WITH PERMANENTLY INSTALLED CASSETTE

(76) Inventors: Harvey Hoekstra, 1169 Springside Rd., San Diego, CA (US) 92128; Mark Hoekstra, 1130 Alta Vista Ave., Escondido, CA (US) 92027

( * ) Notice: Subject to any disclaimer, the term of this patent is extended or adjusted under 35 U.S.C. 154(b) by 0 days.

(21) Appl. No.: 09/161,623

(22) Filed: Sep. 28, 1998

(51) Int. Cl.[7] .................................................. G11B 5/556
(52) U.S. Cl. ................................... 360/72.02; 360/73.04; 360/73.12; 360/73.14
(58) Field of Search ........................... 360/73.01, 73.04, 360/73.09, 97.02, 55, 12, 72.1, 72.2, 73.11, 73.12, 73.13, 73.14

(56) References Cited

U.S. PATENT DOCUMENTS

| 4,636,881 | * | 1/1987 | Brefka et al. ....................... 360/12 X |
| 5,164,865 | * | 11/1992 | Shaw ..................................... 360/72.2 |
| 5,400,185 | * | 3/1995 | Scerbo, III ................................ 360/5 |
| 5,404,343 | * | 4/1995 | Boggio ................................ 360/12 X |
| 5,841,741 | * | 11/1998 | Freeman ............................. 360/12 X |

* cited by examiner

Primary Examiner—Andrew L. Sniezek
(74) Attorney, Agent, or Firm—Donn K. Harms

(57) ABSTRACT

A sealed audio cassette player for playing a single permanently installed audio tape. The player is primarily intended for use with cassettes containing a spoken book, such as the Bible. In one embodiment, frequency indicia are provided on the tape for indicating tape linear speed. A drive motor drives the cassette take up spindle at a predetermined tape linear speed of less than about 0.5 inch per second with rotation of the drive motor varied in accordance with the indicia to maintain a constant tape linear speed. In an alternate embodiment a drive motor drives the cassette take up reel at a constant speed, so that the speed of movement of the tape past an audio pickup head constantly varies. The cassette is recorded with an identical constant speed take up, so that only cassettes so made will work in the player. The cassette is recorded with an identical constant speed take up, so that only cassettes so made will work in the player. This will discourage persons from opening the player and attempting to play standard cassettes. The player is sealed against dirt and moisture. The player is preferably powered by non-removable rechargeable batteries and preferably includes solar cells for maintaining battery charge. A liquid crystal display may be provided for showing the page of a spoken book being played. Switches are included for moving the tape to a selected page.

15 Claims, 2 Drawing Sheets

AUDIO CASSETTE PLAYER WITH PERMANENTLY INSTALLED CASSETTE

FIELD OF THE INVENTION

This invention relates to players for magnetic tapes having audio information recorded thereon.

BACKGROUND OF THE INVENTION

A wide variety of audio recording and playback devices have been developed. The most popular of these uses a small magnetic tape cassette. Audio information, such as music and speech, can be recorded on the tape and played back in any corresponding playback unit. Many such units have both recording and playback capability. To record these cassettes, the tape is fed past a recording head at a constant standard tape speed, conventionally 1⅞ inches per second. The tape can then be played back on any standard speed unit that can feed the tape past a pickup head at that speed.

In addition to their general entertainment value, such tape playback units are of great use in providing information, such as recorded books and the like, to persons who are blind or illiterate. In a particularly advantageous application, the Bible or other appropriate literature can be recorded on tape and provided with a player to church members and prospective converts by churches and missionaries. Many of the new converts are in remote locations, with no literature and no trained pastors. Often these people are illiterate or, though literate, have a preference for hearing rather than reading Scripture.

The use of conventional tape players by these persons has not been fully effective. Conventional tape players are relatively expensive and provide capabilities not necessary for these purposes. Further, the internal components of these players are open when the tape is being changed and they have openings for rotary volume controls and the like. Water, dirt and other contaminants may easily enter and damage the unit. Also, since conventional tape players can play all standard speed tape cassettes, the players may be stolen from a person who only wishes to listen to the spoken Bible and used to play general, usually music, cassettes.

Thus, there is a continuing need for improved audio playback systems for use with recordings of the Bible and similar literature that is sturdy, low cost, entirely enclosed and self-contained, sealed against non-destructive opening and that uses standard tape cassettes while preventing the play of cassettes recorded in the normal manner.

SUMMARY OF THE INVENTION

The above-noted problems, and others, are overcome in accordance with this invention by an audio tape playback unit which comprises a sealed audio cassette player for playing a single cassette, which basically includes an audio tape entrained between two reels mounted on spindles within a cassette, drive motor means for driving at least one tape spindle at a variable speed to move the tape onto the reel on that spindle, a playback head engaging the tape between the reels and an audio output means, typically an audio amplifier and speaker, for producing sounds corresponding to the playback head signal.

In one embodiment, a variable speed drive motor drives the take up spindle, with a microprocessor varying the tape linear speed at a very low rate to significantly increase the amount of spoken information that can be recorded on a conventional tape cassette.

In an alternative embodiment, the linear tape speed can be allowed to vary with the varying speed being the same for recording and playback. Since a conventional tape linear speed controller (generally a capstan and pinch roller), need not be used the actual linear tape speed can vary during playback in accordance of the amount of tape already wound on the take up reel.

Thus, in either case the tape player of this invention cannot play conventional cassette tapes that are recorded with a constant tape linear speed rather than constant reel rotational take-up speed or are intended to use tapes recorded at a higher linear speed. This removes all incentive to open the player (which would lead to rapid contamination and failure of the player in the field) or for others to steal the player from the owner.

While the speed match between the recording and playback as controlled by the motor controller circuit is generally very good, a manual speed control is preferably included to permit slight changes in the take up reel speed to tune the sound for maximum clarity. Generally, very slight variations in take up speed will be fully understandable, only the speakers voice pitch will change slightly. Generally, blind persons prefer to listen at a faster speed. A volume control is also preferably included.

While the embodiment using a constant (subject to slight adjustments) take-up spindle speed with varying tape linear speed is simple, reliable and inexpensive, in order to increase the amount of material recorded on a given tape, if desired, the motor driving the take-up spindle can be controlled to provide a constant slow tape linear speed. Conventional frequency electronic indicia are provided along the tape, to be read by a head and used to vary the motor speed to provide a substantially constant linear speed corrected for the accumulation of tape on the take-up reel.

Preferably, the player is powered by rechargeable batteries with a small solar panel mounted on the player to recharge them. People then will be able to listen to the "audio book" tape while walking, bicycling, etc. Also, the player will be fully useable on farms or small villages there may be no outside power available. However, an external power source jack is preferably included for circumstances where outside power is available.

The tape linear feed rate is preferably less than about 25% of the normal 1⅞ inches per second rate, or less than about ½ inch per second. For maximum recording with excellent playback quality, average tape linear speeds in the about 0.2 to 0.5 inch per second are used. For voice, this low speed provides very good fidelity and greatly increases the recording capability of a conventional cassette. While any suitable number of tracks may be provided on the tape, best results have been obtained with four. With the preferred speed and number of tracks, an entire spoken Bible can be included on a single cassette. All of the four tracks are recorded in one direction, with high speed rewind capability provided to return the tape to the beginning.

Any suitable conventional magnetic indicia may be included along the tape to indicate the page of text being read. Also, conventional frequency indicia are desirable for use in controlling tape speed, where desired. Such page or frame identification is conventionally included with video tapes and the like. A liquid crystal display (LCD) is preferably included housing to indicate the page being heard. A suitable number of push buttons for the number of tracks stored on the tape, e.g., four buttons for four tracks, are preferably included on the housing. Each button corresponds to one of the tracks being played. Thus, the first of four buttons is pressed when the first track is desired. Each of the other tracks is similarly selected by pushing its respective button. Alternately, one button may set the track (from 1 to 4) by pushing the button the number of times equal to the track number desired and the other three buttons may combine to select any page on that track up to 999.

Fast forward and fast reverse buttons are also preferably included so that the user can move quickly forward or back to a desired page number, as shown on the LCD display. This is particularly convenient in allowing the user to move back a few pages to hear a passage again.

The housing should be well sealed against moisture, dust and the like, since the player is likely to be used in less than ideal conditions. The housing can typically be sealed together with any suitable adhesive. The various push buttons are preferably of the type having a soft rubber body sealed to the player housing. Wheel type controls, such as for volume and take up spindle speed adjustment are preferably contained in sealed wells, with only the wheel shaft extending into the housing through a close fitting bearing.

BRIEF DESCRIPTION OF THE DRAWING

Details of the invention, and of preferred embodiments thereof, will be further understood upon reference to the drawing, wherein.

DETAILED DESCRIPTION OF PREFERRED EMBODIMENTS

Figure 1:
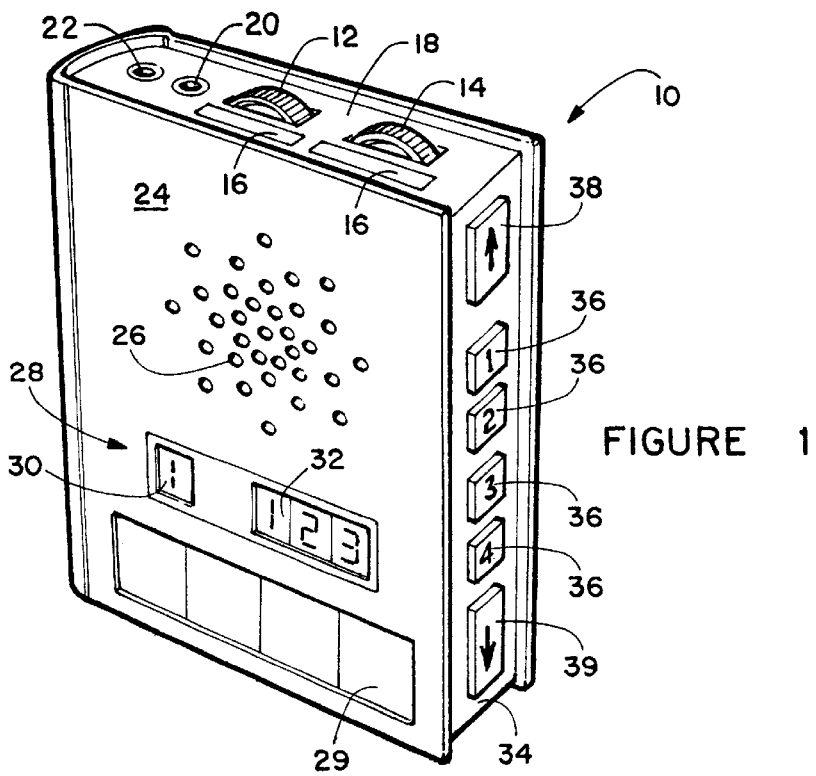
FIG. 1 is a perspective view of a cassette tape player according to this invention.

Referring to FIG. 1, there is seen a perspective view of the sealed audio cassette player 10 of this invention. The player is rectangular and about the size of an ordinary book for ease of carrying.

At the top two rotary controls, a volume control 12 and a tape take up spindle speed varying control 14 are provided. Volume control 12 also serves as an on-off switch at the lower volume end of the control rotation. Speed control 14 makes adjustments in take up spindle speed which allows the listener to slightly adjust tape linear speed as desired. Each of the controls 12 and 14 is set into a well 16 in top surface 18. Typically each well is formed from plastic and comolded with top 18 and other portions so as to seal against moisture or dust entrance.

An external speaker or headphone jack 20 is mounted in top surface 18 so that a headphones or the like may be used for private listening. Conventionally, insertion of a headphone plug into jack 20 will turn off the internal speaker, described below, and activate the headphones. Or, an external speaker can be connected for village and group listening to programs. Also, an external power source jack 22 is provided for connection to an outside power source. The outside source may be used when internal batteries are exhausted or to conserve the internal batteries.

A speaker is positioned behind the front surface 24 of player 10. Typically only a thin cover is provided over the speaker, to allow sound to exit the housing. The housing material (typically plastic) will have a grill or perforations 26 formed therethrough, with a paper or very thin plastic label pasted over one side to seal the unit against entry of dust, water or the like.

An array 28 of four liquid crystal displays (LCD's) is mounted in front surface 24. The first display indicates the tape track being played, generally from 1 to 4. The other three displays give the page number of the page being heard, up to 999. If desired, the array 28 could omit the track LCD and have four page number LCD's so that pages through 9999 could be shown for the entire tape.

Solar cells 29 are preferably mounted on one or more surfaces of player 10 to operate the system and/or to charge the battery.

At side 34 of player 10, four push buttons 36 are provided. These buttons may be used to change the desired track being played in a first embodiment. Push buttons 36 may be used to change the desired track being played. Each buttons represents one of the four tracks. the player o=would begin playing the track of the button 36 that is pushed at the moment that button is pushed. Fast forward and rewind buttons 38 and 39 allow the user to advance or rewind the tape while staying on the selected track as seen on LCD display 30. The moment the rewind or fast forward button is release the player begins to play at the new location on the same track that it was on and LCD display 32 will reflect the new tape location (page). The three numbers on LCD screen 32 increase or decrease according to the direction the tape is moving. If a different one of push buttons 36 is pushed then the player switches to that track and begins to play at the same location. Similarly, if any other push button 36 is pushed the player switches to the selected track and begins playing. To get to a higher or lower page, the fast forward and rewind buttons 38 or 39 is used.

In another arrangement the buttons may be used to advance the numbers shown in LCD array 28 to change the page number being heard. In this version where one LCD 30 shows the track, repeatedly pushing the first button 36 will sequentially advance the track number 30, 1 to 4 and repeat. The other three buttons 36 would similarly advance corresponding LCD's 32, each 0 to 9 and repeat. In the alternative where all LCD's in array 28 show page numbers, buttons 36 will each advance the display of one of the LCD's in array 28. By pushing button 38 or 39 once the tape will advance or rewind to the marker corresponding to the desired LCD readout.

Figure 2:
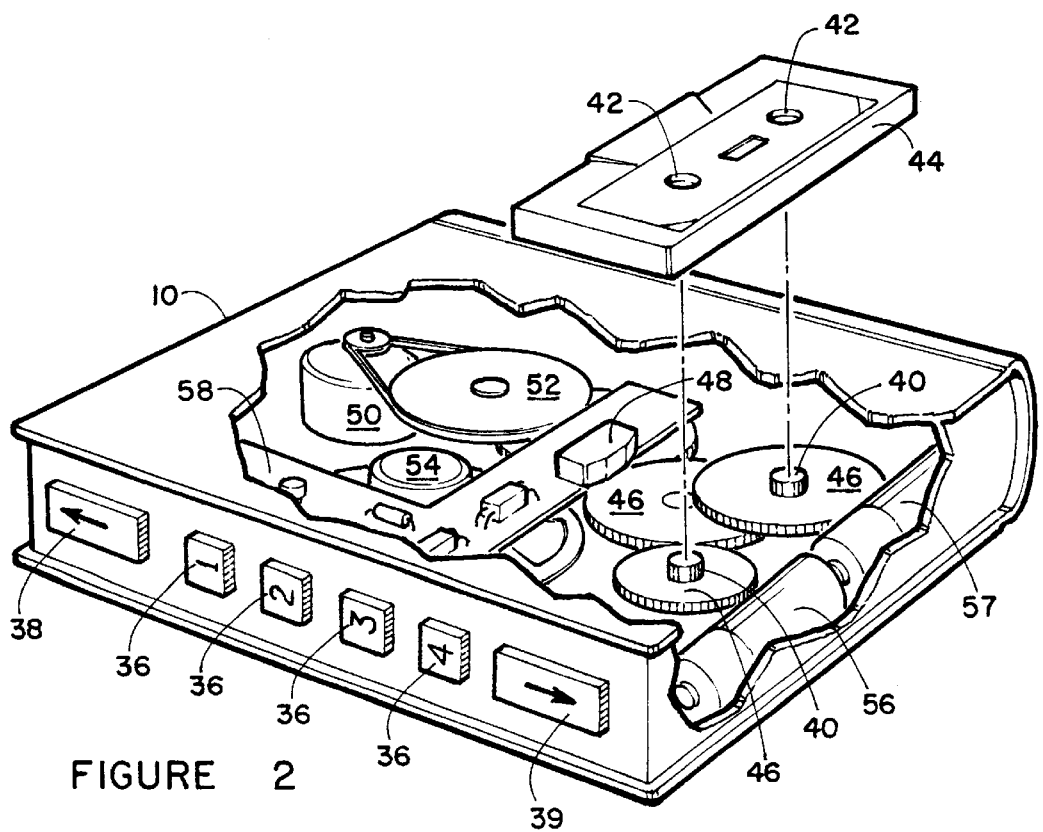
FIG. 2 is a schematic perspective representation of the internal components of the player, partially exploded.

FIG. 2 is a schematic perspective view of player 10 with the outer housing and most components mounted on the housing removed for clarity. Internal components include two spindles 40 for receiving hubs of cassette 42. A conventional gear mechanism schematically indicated at 46 is provided for reversing the direction of movement of tape (not seen) in cassette 44. A playback head 48 is positioned to be brought into contact in a conventional manner with the tape in cassette 44 when the cassette is inserted during manufacturing of the unit. Head 48 includes both conventional audio pickup means and means for detecting indicia (typically a small magnetic signal conventionally included along an edge of each tape track) showing the page number being heard or frequency indica for use in controlling the take-up spindle motor in the variable speed motor version.

Alternately, the indicia may be on either the feed or takeup spindle. In that case, motor voltage would strep up and down at a constant rate calculated to accommodate the changing diameter of the tape on the spindle as the diameter changes for the initial diameter at the start where all tape is on one spindle. While these embodiments are preferred, with indica along the tape itself providing optimum performance, any other drive control means may be used if desired.

As schematically shown, a motor 50 drives spindles 40 via belt and pulley 52 and the gear system 46 in a conventional manner. Typically, motor 50 is operated at a basic single speed, with provision for small speed adjustments so that the tape linear speed will gradually increase as the take-up reel fills up. Alternatively motor 50 may be operated at a variable speed under control of a conventional integrated circuit to provide the desired spindle speed, producing a substantially uniform tape speed past the playback head.

As mentioned above, a speaker 54 is mounted on the inner side of front surface 24. Batteries 56 are secured in a compartment 57 to power motor 50 and the control system. Wires between the various internal components are not shown for clarity of illustration. Compartment 57 in which batteries 56 are housed is isolated from the balance of the interior of player 10 so no moisture, dust or other contaminants can migrate from the battery compartment, which can be opened to replace batteries, into the player.

The microprocessor control and other electronic components are housed in any volume or box 58 out of the way, such as near speaker 54.

Figure 3:
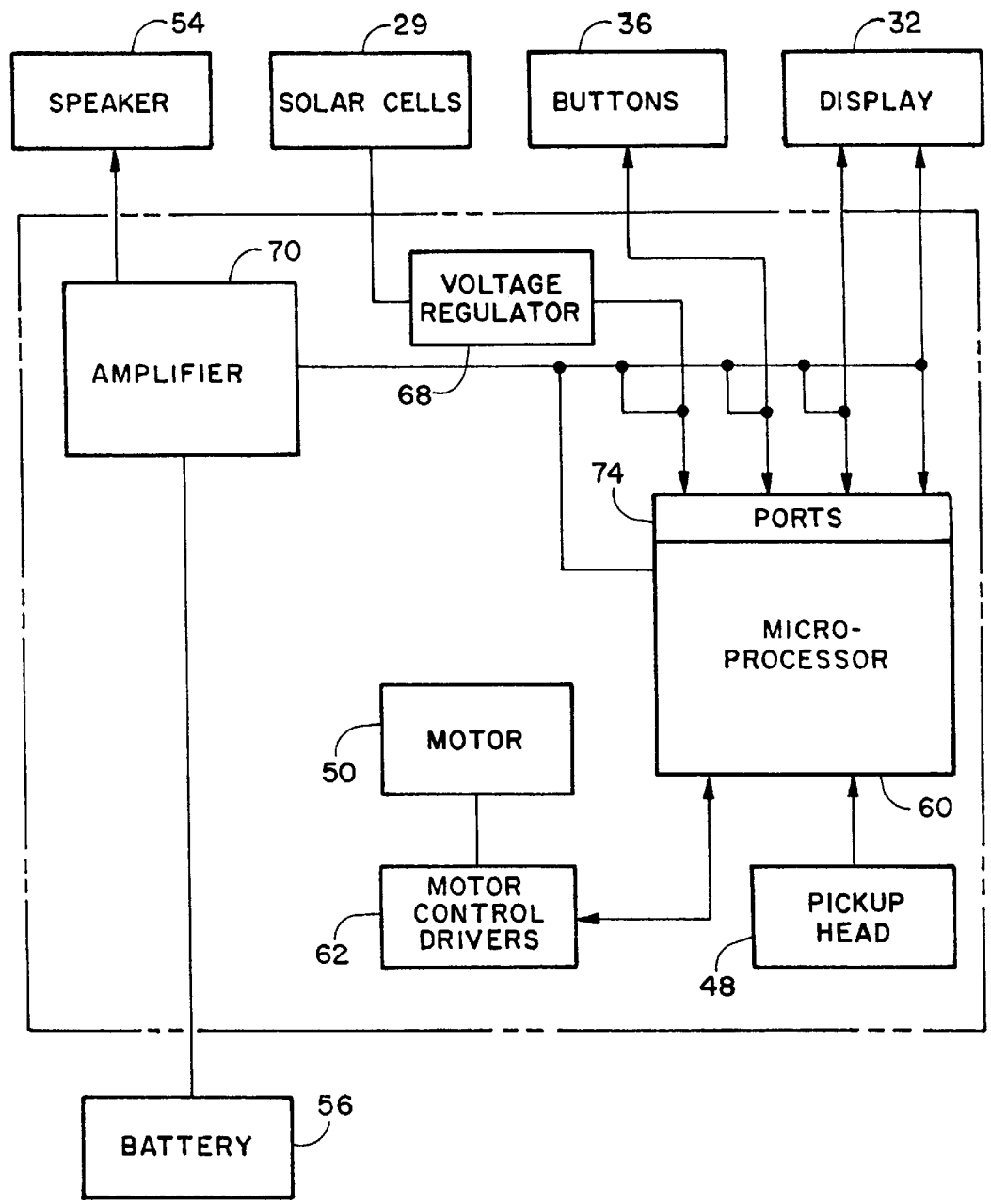
FIG. 3 is a schematic flow diagram of the system operating and control system.

FIG. 3 provides a schematic flow diagram of the operating electronic components. Microprocessor 60 provides overall logic and component control. Microprocessor 60 could be a component specifically designed in a conventional manner for this system, or could be a standard microprocessor, programmed in a conventional manner to provide the required operating controls. A conventional motor control driver 62, typically using several 74HCT74 dual D-type positive edge-triggered flip flops with pre-set and clear functions, in conjunction with several 74HCT86 AND gates provides speed control to motor 50 and the ability to adjust motor speed slightly through speed control 14. Where motor 50 is driven at an approximately constant speed, the only control means required adjusts speed slightly to the preference of the user, as discussed above. In the embodiment where linear tape speed is controlled to be uniform in accordance with indicia on the tape, conventional speed control electronics are provide, using CMOS logic circuits and a 74ALS299N shift register. Battery 56 supplies poser to amplifier 70 and, powers motor 50 under control of motor control driver 62.

Speaker 54, such as a standard 8 ohm speaker designed to operate under 300 milli-watts, is powered by conventional preamplifier and power amplifier 70, such as a SSM2017P pre amp from Tech America and a LM388 amplifier from Radio Shack.

Solar cells 29, bonded to the back of player 10 and to the lower front surface, are controlled by microprocessor 60 via analog and digital ports 74 and function to supply system power and recharge battery 56 under control of voltage regulator 68. Buttons 36 and LCD display 32 are connected to microprocessor 60 in a conventional manner. Typical buttons 36 include membrane switches and keyboard type miniature switches. Typical LCD displays include the MM5453 from Radio Shack. Microprocessor 60 also controls the signal from head 48 to amplifier 70 to speaker 54 and controls motor rotation direction and speed in accordance to signals received from buttons 36.

While certain specific relationships, materials and other parameters have been detailed in the above description of preferred embodiments, those can be varied, where suitable, with similar results. Other applications, variation and ramifications of the present invention will occur to those skilled in the art upon reading the present disclosure. Those are intended to be included within the scope of this invention as defined in the appended claims.

What is claimed is:

1. A sealed audio cassette player for playing a single cassette permanently installed in said player which comprises:
   an audio cassette including a cassette case and an audio information signal bearing tape entrained between a feed spindle and a take up spindle;
   drive motor means for rotating said take up spindle for feeding said tape from said feed spindle to said take up spindle;
   frequency indicia on one of said tape, feed spindle and take up spindle for indicating tape speed;
   a detection means for detecting said indicia and varying rotational speed of said drive motor means to maintain said tape linear speed substantially constant at a predetermined linear speed of less than about 0.5 inch per second;
   a playback head in operative engagement with said tape between said spindles for detecting an audio signal;
   a speaker for generating sound in response to said audio signal as detected by said playback head;
   battery means for powering all components;
   microprocessor means for controlling operation of said cassette player;
   a closed housing surrounding all components and sealed against entry of outside agents.

2. The sealed audio cassette player according to claim 1 wherein said battery is rechargeable and further including a solar charging panel mounted on said closed housing.

3. The sealed audio cassette player according to claim 1 wherein said audio information is organized as a series of numbered pages and further including indicia on said recorded tape indicating page number and a means adjacent to said tape for reading said indicia under control of said microprocessor.

4. The sealed audio cassette player according to claim 3 further including a series of push button means for selecting a specific page under control of said microprocessor and a liquid crystal number display showing the number of the page selected.

5. The sealed audio cassette player according to claim 4 further including a fast forward means for rapid cycling through page numbers to higher numbers and a fast reverse means for rapid cycling through page numbers to lower numbers under control of said microprocessor.

6. The sealed audio cassette player according to claim 4 further including further including an external speaker jack for directing sound to an external speaker and an external power jack for providing external power to the audio cassette player.

7. The sealed audio cassette player according to claim 1 wherein said predetermined linear speed is between about 0.5 and 0.2 inch per second.

8. A sealed audio cassette player for playing a single cassette permanently installed in said player which comprises:
   an audio cassette including a cassette case and a recorded tape bearing an audio information signal, entrained between two spindle mounted reels;
   drive motor means for feeding said tape between said reels;
   said drive motor having a playback mode for rotating a take up reel spindle at a substantially uniform spindle rotational speed;
   a playback head in operative engagement with said tape between said reels;

a speaker for generating sound in response to audio information detected by said playback head;

battery means for powering all components;

microprocessor means for controlling said cassette player;

a closed housing surrounding all components and sealed against entry of outside agents;

said audio information being organized as a series of numbered pages and further including indicia on said recorded tape indicating a sequential page number and a means adjacent to said tape for reading said indicia under control of said microprocessor; and further including a series of push button controlled means for selecting a specific page under control of said microprocessor and a liquid crystal number display showing the number of the page selected.

9. The sealed audio cassette player according to claim 8 wherein said battery is rechargeable and further including a solar charging panel mounted on said closed housing.

10. The sealed audio cassette player according to claim 8 further including a fast forward means for rapid cycling through page numbers to higher numbers and a fast reverse means for rapid cycling through page numbers to lower numbers under control of said microprocessor.

11. The sealed audio cassette player according to claim 8 further including further including an external speaker jack for directing sound to an external speaker and an external power jack for providing external power to the audio cassette player.

12. A sealed audio cassette player for playing a single cassette permanently installed in said player which comprises:

an audio cassette including a cassette case and an audio information signal bearing tape entrained between a feed spindle and a take up spindle;

drive motor means for rotating said take up spindle for feeding said tape from said feed spindle to said take up spindle;

means for controlling tape linear speed to maintain said tape linear speed substantially constant at a predetermined linear speed of less than about 0.5 inch per second;

a playback head in operative engagement with said tape between said spindles for detecting an audio signal;

a speaker for generating sound in response to said audio signal as detected by said playback head;

battery means for powering all components;

microprocessor means for controlling operation of said cassette player;

a closed housing surrounding all components and sealed against entry of outside agents.

13. The sealed audio cassette player according to claim 12 wherein said audio information is organized as a series of numbered pages and further including indicia on said recorded tape indicating page number and a means adjacent to said tape for reading said indicia under control of said microprocessor.

14. The sealed audio cassette player according to claim 12 further including a series of push button means for selecting a specific page under control of said microprocessor and a liquid crystal number display showing the number of the page selected.

15. The sealed audio cassette player according to claim 12 further including a fast forward means for rapid cycling through page numbers to higher numbers and a fast reverse means for rapid cycling through page numbers to lower numbers under control of said microprocessor.

* * * * *